United States Patent

Xu et al.

(10) Patent No.: US 9,596,325 B2
(45) Date of Patent: *Mar. 14, 2017

(54) DATA FRAME FOR PLC HAVING DESTINATION ADDRESS IN THE PHY HEADER

(71) Applicant: Texas Instruments Incorporated, Dallas, TX (US)

(72) Inventors: Gang Xu, Allen, TX (US); Ramanuja Vedantham, Allen, TX (US); Kumaran Vijayasankar, Allen, TX (US); Anand G. Dabak, Plano, TX (US); Tarkesh Pande, Richardson, TX (US); Il Han Kim, Allen, TX (US); Xiaolin Lu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/556,373

(22) Filed: Dec. 1, 2014

(65) Prior Publication Data

US 2015/0085881 A1 Mar. 26, 2015

Related U.S. Application Data

(63) Continuation of application No. 13/528,667, filed on Jun. 20, 2012, now Pat. No. 8,929,398.

(60) Provisional application No. 61/498,884, filed on Jun. 20, 2011.

(51) Int. Cl.
- H04J 3/24 (2006.01)
- H04L 29/06 (2006.01)
- H04B 3/54 (2006.01)

(52) U.S. Cl.
CPC ............... *H04L 69/22* (2013.01); *H04B 3/54* (2013.01); *H04B 3/542* (2013.01); *H04B 2203/5408* (2013.01)

(58) Field of Classification Search
None
See application file for complete search history.

(56) References Cited

U.S. PATENT DOCUMENTS

| 4,658,250 | A  | * | 4/1987  | Nering  | G06F 13/374 370/462 |
| 5,416,777 | A  | * | 5/1995  | Kirkham | 370/449 |
| 7,599,353 | B2 | * | 10/2009 | Kim et al. | 370/352 |
| 8,614,961 | B1 | * | 12/2013 | Katar et al. | 370/252 |

* cited by examiner

*Primary Examiner* — Edan Orgad
*Assistant Examiner* — Rebecca Song
(74) *Attorney, Agent, or Firm* — Kenneth Liu; Charles A. Brill; Frank D. Cimino

(57) ABSTRACT

A physical layer (PHY) data frame for use in conjunction with processor in a node, processor coupled to a program memory for storing a sequence of operating instructions. The frame has a preamble, PHY header, a MAC header and a MAC payload. The PHY header includes a destination address field having a destination address therein. The destination address is used by the processor to determine match with the node address.

14 Claims, 2 Drawing Sheets

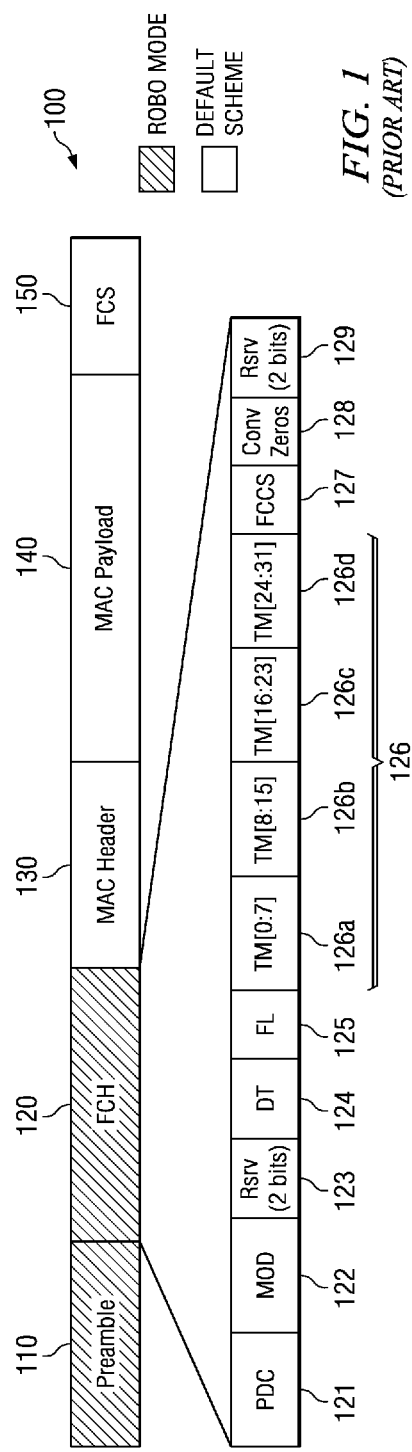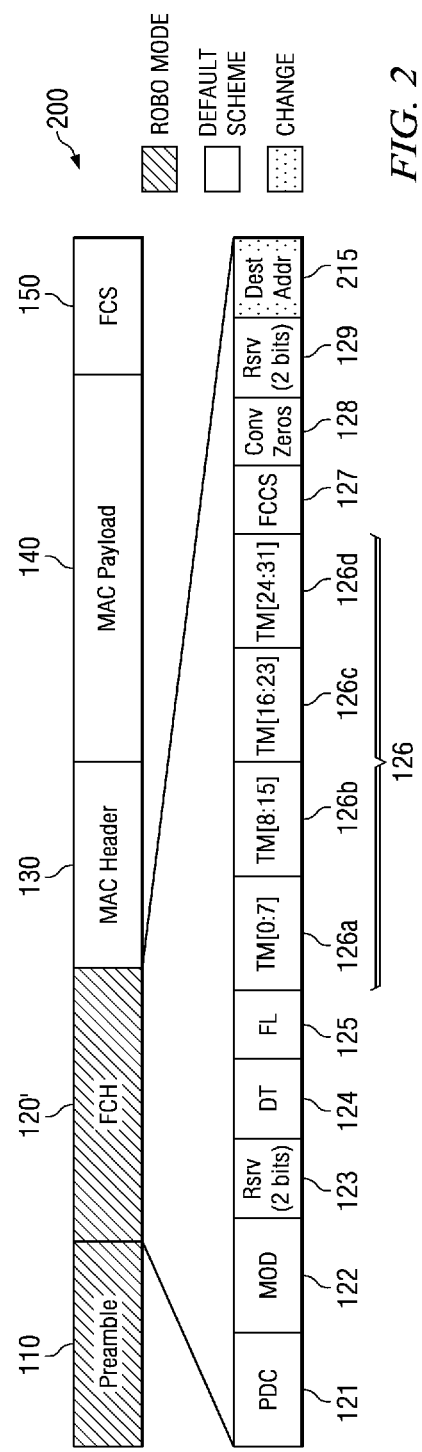

DATA FRAME FOR PLC HAVING DESTINATION ADDRESS IN THE PHY HEADER

CROSS REFERENCE TO RELATED APPLICATIONS

The application is a continuation of and claims priority to U.S. patent application Ser. No. 13/528,667, filed on Jun. 20, 2012—now U.S. Pat. No. 8,929,398, issued on Jan. 6, 2015—which in turn claims the benefit of U.S. Provisional Application Ser. No. 61/498,884 filed Jun. 20, 2011 entitled "POWER SAVING IN PLC NETWORKS BY OPPORTUNISTICALLY EMBEDDING MAC ADDRESS IN PHY HEADER." Said applications are herein incorporated by reference in their entirety.

FIELD

Disclosed embodiments relate generally to the field of powerline communications and, more specifically, to data frame structures for powerline communications.

BACKGROUND

Powerline communications (PLC) include systems for communicating data over the same medium (i.e., a wire or conductor) that is also used to transmit electric power to residences, buildings, and other premises. Once deployed, PLC systems may enable a wide array of applications, including, for example, automatic meter reading and load control (i.e., utility-type applications), automotive uses (e.g., charging electric cars), home automation (e.g., controlling appliances, lights, etc.), and/or computer networking (e.g., Internet access), to name only a few.

FIG. 1 shows the structure of a PHY data frame 100 for an Orthogonal Frequency-Division Multiplex (OFDM) physical layer (PHY) based on the IEEE 1901.2 standard including the various fields in the PHY header shown. For IEEE P1901.2, the PHY header is referred to as a frame control header (FCH). Data frame 100 includes a preamble 110, a FCH 120, a MAC header 130, a MAC (data) payload 140, and a FCS 150. Although not shown, the MAC header 130 includes a destination address field which is used by receiving nodes to determine if the frame received on the PLC channel is intended for that node or not. The FCH 120 does not include a destination address field.

The preamble 110 and FCH 120 are indicated as being ROBO mode modulation (Robust OFDM mode). ROBO modulation is considered robust in the sense that it may provide four times extra redundancy parity bits by using a repetition code and therefore the network may more reliably deliver data under severe channel conditions. FCH 120 includes fields including Phase Detection Counter (PDC) 121, Modulation type (MOD; such as 0 for ROBO; 1 for DBPSK and 2 for DQPSK) 122, Reserved (Rsrv) bits 123, delimiter type (DT) 124, frame length (FL; the PHY frame length in PHY symbols) 125, tone map (TM) 126 comprising TM [0:7] 126a, TM [8:15] 126b, TM [16:23] 126c, and TM [24:31] 126d, Frame Control Check Sequence (FCCS) 127, conv zeros (e.g., 6 zeros for convolutional encoder) 128, and Rsrv bits 129.

Since the PHY header in PLC standards, such as IEEE P1901.2 (e.g., FCH 120 in FIG. 1), does not include a destination address field, a node has to wait to decode the entire MAC header and MAC payload and the verification of the cyclic redundancy check (CRC) before knowing if it is the intended destination node (receiver) for the frame. Accordingly, the MAC header 130 is decoded only after the CRC verification is successful to determine if the frame is intended for that node or not. Moreover, known PLC specifications generally have no way to distinguish between corruption of the MAC header 130 and corruption of the MAC payload 140.

SUMMARY

Disclosed embodiments recognize PLC standards, such as IEEE P1901.2, that lack a destination address field in the PHY header, require received frames to be decoded fully (MAC header and MAC payload for data frames) and verification CRC has passed before knowing if the node is the intended destination node (receiver) for the frame. This results in unnecessary power consumption when processing unintended frames. This frame processing flow also introduces ambiguity upon the transmission of an acknowledgement (ACK, such as a negative ACK or NACK) frame from a receiving node when the frame received is corrupted because it is possible that the destination address in the MAC header is corrupted and a node that is actually not the intended receiver may be the node transmitting the ACK.

Disclosed embodiments include data frames formatted to have the destination address in the PHY header. Since the destination address is in PHY header, this information can be used by the receiving node to decode only those frames that are intended for it. Decoding is thus performed only on intended frames, no longer on frames not intended for that node which are decoded in known PLC specifications, such as the IEEE P1901.2 specification, thus conserving power by no longer decoding unintended frames.

Moreover, unlike known PLC specifications, such as the IEEE P1901.2 specification, disclosed data frames having the destination address in the PHY header can identify MAC header corruption to enable distinguishing between MAC header corruption and MAC payload corruption. This enables sending a negative acknowledgment (NACK) only in the case of MAC payload corruption to eliminate node identity ambiguity upon the transmission of a NACK when the received frame is corrupted.

BRIEF DESCRIPTION OF THE DRAWINGS

Reference will now be made to the accompanying drawings, which are not necessarily drawn to scale, wherein:

FIG. 1 shows the structure of a PHY data frame based on the IEEE P1901.2 standard showing the various fields in its PHY header (a FCH).

FIG. 2 shows the structure of an example PHY data frame having a destination address within the PHY header, according to an example embodiment.

DETAILED DESCRIPTION

Figure 3:
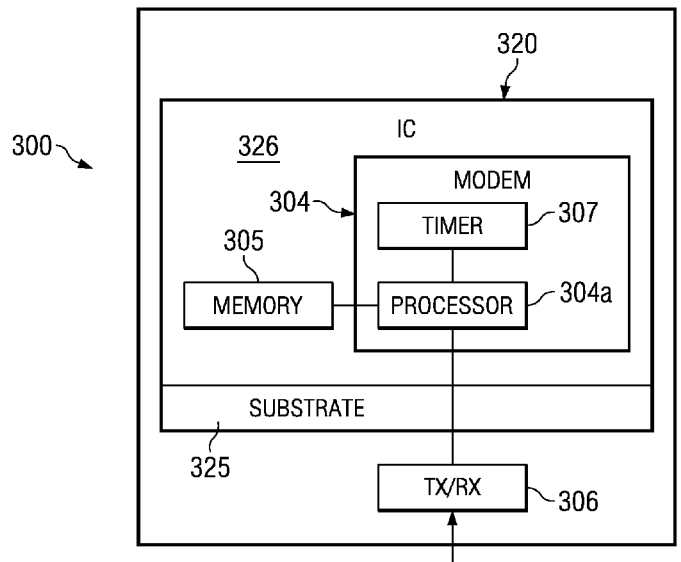
FIG. 3 is a block diagram schematic of a communication device having a disclosed modem that runs a disclosed algorithm which implements compiling of PHY data frames including a destination address in the PHY header for powerline communications, according to an example embodiment.

Disclosed embodiments now will be described more fully hereinafter with reference to the accompanying drawings.

Such embodiments may, however, be embodied in many different forms and should not be construed as limited to the embodiments set forth herein. Rather, these embodiments are provided so that this disclosure will be thorough and complete, and will fully convey the scope of this disclosure to those having ordinary skill in the art. One having ordinary skill in the art may be able to use the various disclosed embodiments and there equivalents. As used herein, the term "couple" or "couples" is intended to mean either an indirect or direct electrical connection. Thus, if a first device couples to a second device, that connection may be through a direct electrical connection, or through an indirect electrical connection via other devices and connections.

As described above, for PLC standards such as IEEE P1901.2, the MAC header in the frame is decoded only after the CRC verification is successful to determine if the frame is intended for that node or not. This can be an expensive and energy consuming operation that is performed on every frame, including frames not intended for that node. Also, some PLC standards, such as IEEE P1901.2, require a destination node to send a NACK if the MAC CRC failed, which introduces ambiguity in the transmission of NACK when the received MAC frame is corrupted since it is possible that the destination address in the MAC header is corrupted and a node that is not the intended receiver may be the node transmitting the NACK. The problem arises because the MAC CRC protects both the header and the payload of the MAC frame, so it is possible that the destination address field is corrupted when the CRC has failed.

Disclosed PHY data frames having a destination address within the PHY header solve the above problems, and also eliminate node identity ambiguity upon the transmission of a NACK when the received frame is corrupted. In one embodiment, a destination address field (e.g., a 2-byte field) is added inside the PHY Header (e.g., FCH in case of IEEE P1901.2) for all data frames, but not for non-data frames such as ACK frames. The DT field (see DT 124 in FIG. 1 and FIG. 2 described below) allows uniquely identifying ACK/NACK frames from data frames, and data frames can also be distinguished from ACK/NACK frames based on the destination address field in disclosed data frames.

If the network address of the receiving node does not match the destination address in the PHY header of the received data frame, the receiving node can skip the decoding of the entire MAC Header 130 and MAC payload 140 thus providing considerable power savings. Disclosed embodiments allow for nodes to transmit the NACK frame only if the destination address in the PHY header matches its own address, even if the data frame is corrupted (corrupted MAC header and/or payload).

In one embodiment the data frame sent by the first node includes a reserved destination address field set to a reserved value in the PHY header for nodes in the PLC network that use an extended address which are not yet registered to the PLC network. The second node when registered to the PLC network uses the reserved destination address field to skip decoding of the data frame. Since nodes in the network that are registered to the network will have a shorter address, all registered nodes can skip the decoding of the entire MAC header and MAC payload if this reserved value is in the PHY Header. This embodiment thus allow nodes that are part of the network to skip the decoding of frames intended for nodes trying to join the network.

FIG. 2 shows the structure of an example data frame 200 having a destination address field 215 within the PHY header, according to an example embodiment. The PHY header is shown as FCH 120' (based on IEEE P1901.2 nomenclature) to distinguish from FCH 120 in FIG. 1 which lacks a disclosed destination address field 215. Data frame 200 includes the fields shown for data frame 100 in FIG. 1, along with an added destination address field 215 which in the embodiment shown is placed after the DT field 124. Since the DT field 124 can be parsed before the destination address field 215 to identify ACK/NACK frames and thus distinguish ACK/NACK frames from data frames, the receiver node can look for the destination address field 215 only for data frames.

In addition, since the destination address field 215 is included in FCH 120', this address information can be encoded with the ROBO modulation scheme (Robust OFDM). ROBO modulation is robust in the sense that it may provide four times extra redundancy parity bits by mean of repetition code and therefore the system may reliably deliver data under severe channel conditions.

FIG. 3 is a block diagram schematic of a communication device 300 having a disclosed modem 304 that runs a disclosed frame compiling algorithm which implements compiling of data frames including a destination address in the PHY header for powerline communications, according to an example embodiment. Communication device 300 is for communications at a first node on a PLC channel in a PLC network including at least a second node. Communications device 300 can be used at a service node (which includes switch nodes and terminal nodes) or a base (data concentrator) node in the PLC communications network.

Modem 304 includes a processor (e.g., a digital signal processor, (DSP)) 304a coupled to an associated memory 305 that that stores a disclosed frame compiling algorithm which provides code for compiling frames including PHY data frames having a destination address in the PHY header. Memory 305 comprises machine readable storage, for example, static random-access memory (SRAM). The processor 304a is programmed to implement a disclosed frame compiling algorithm. Modem 304 includes a timer 307, such as for ACK transmission, Carrier Sense Multiple Access/collision avoidance (CSMA)/CA) back-off and data transmission purposes.

The PLC transceiver (TX/RX) 306 is communicably coupled to the modem 304 for coupling of the communications device 300 to the shared powerline 340. Transceiver 306 facilitates communications with other SNs and the BN on the powerline 340.

The modem 304 is shown formed on an integrated circuit (IC) 320 comprising a substrate 325 having a semiconductor surface 326, such as a silicon surface. Memory 305 may be included on the IC 320. In another embodiment the modem 304 is implemented using 2 processor chips, such as 2 DSP chips. Besides the DSP noted above, the processor 304a can comprise a desktop computer, laptop computer, cellular phone, smart phone, or an application specific integrated circuit (ASIC).

Disclosed modems 304 and disclosed communications devices 300 can be used in a PLC network to provide a networked device that in service is connected to a powerline via a power cord. In general, the "networked device" can be any equipment that is capable of transmitting and/or receiving information over a powerline. Examples of different types of networked devices include, but are not limited or restricted to a computer, a router, an access point (AP), a wireless meter, a networked appliance, an adapter, or any device supporting connectivity to a wired or wireless network.

Figure 4:
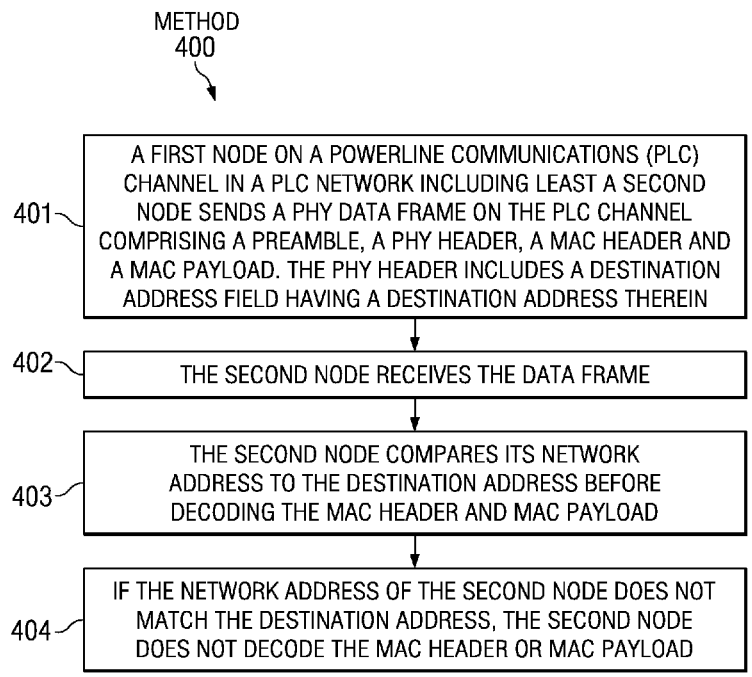
FIG. 4 is a flowchart for an example method of powerline communications using PHY data frames having a destination address within the PHY header, according to an example embodiment.

FIG. 4 is a flowchart for an example method of powerline communications in a PLC network including a first node and at least a second node on a PLC channel using data frames having a destination address within the PHY header. In step 401, the first node sends a data frame on the PLC channel comprising a preamble, a PHY header, a MAC header and a MAC payload. The PHY header includes a destination address field having a destination address therein, such as a 2 byte address field. In step 402, the second node receives the data frame. In step 403 the second node compares its network address to the destination address before decoding the MAC header and MAC payload. In step 404, if the network address of the second node does not match the destination address, the second node does not decode the MAC header or MAC payload.

All non-data frames (e.g., ACK, NACK) used in the PLC network can exclude a destination address field in their PHY headers. The destination address field can be after the DT field in the data frame, which allows the second node to not parse for a destination address field of a received frame if the DT field of the received frame indicates a non-data frame. The PHY header including the destination address field can be encoded with a ROBO modulation scheme which includes a repetition code, making the destination address information more robust.

The second node can transmit a NACK frame responsive to the data frame received only if the destination address matches the network address. In this embodiment, if at least one of the MAC header and MAC payload are corrupted, the second node can still transmit the NACK frame responsive to the data frame.

As described above, in one embodiment, the data frame sent by the first node includes a reserved destination address field set to a reserved value in the PHY header for nodes in the PLC network that use an extended address which are not yet registered to the PLC network. The second node when registered to the PLC network uses information in the reserved destination address field to skip decoding of the data frame. Since nodes in the network that are registered to the network will have a shorter address, all registered nodes can skip decoding of the entire MAC header and MAC payload if this reserved value is in the PHY Header. This embodiment allows nodes that already part of the network to skip the decoding of frames intended for nodes trying to join the network.

Many modifications and other embodiments of the invention will come to mind to one skilled in the art to which this Disclosure pertains having the benefit of the teachings presented in the foregoing descriptions, and the associated drawings. Therefore, it is to be understood that embodiments of the invention are not to be limited to the specific embodiments disclosed. Although specific terms are employed herein, they are used in a generic and descriptive sense only and not for purposes of limitation.

We claim:

1. A non-transitory computer-readable medium comprising instructions that, when executed by a processor of a receiving node in a powerline communication (PLC) network causes the processor to:
   determine whether a destination address field of a physical layer (PHY) data frame received by the receiving node matches a receiving node address of the receiving node or whether the destination address field is set to a reserved value indicating a node using an extended address which is not yet registered to the PLC network, and wherein the PHY data frame includes a preamble, a PHY header including the destination address field, a media access control (MAC) header, and a MAC payload; and
   skip decoding of the entire MAC header and the MAC payload when the processor determines that the receiving node address indicates the receiving node is a node registered to the PLC network and the destination address field is set to the reserved value.

2. The non-transitory computer-readable medium of claim 1, wherein the processor comprises a digital signal processor (DSP).

3. The non-transitory computer-readable medium of claim 1, wherein the PHY data frame includes a delimiter type (DT) field, and wherein the destination address field is after the DT field.

4. The non-transitory computer-readable medium of claim 1, wherein, when the receiving node is determined to be registered to the PLC network, the receiving node address is shorter than the extended address for nodes not yet registered to said the PLC network.

5. A method of powerline communication (PLC) in a PLC network, the method comprising:
   receiving a physical layer (PHY) frame at a receiving node, wherein the PHY frame comprises a PHY header, a MAC header, and a MAC payload, and wherein the PHY header comprises a destination address field configured to indicate a destination address for registered nodes in the PLC network and a reserved value for unregistered nodes in the PLC network;
   comparing a network address of the receiving node to information indicated by the destination address field of the received data frame; and
   not decoding the MAC header and the MAC payload when the destination address field indicates the reserved value and the receiving node is a registered node in the PLC network.

6. The method of claim 5, wherein the received PHY frame comprises a preamble.

7. The method of claim 5, wherein the received PHY frame comprises a delimiter type (DT) field located before the destination address field in the received data frame, the delimiter field indicating whether the received data frame contains data or non-data.

8. The method of claim 7, wherein non-data comprises an acknowledgement (ACK) or negative acknowledgement (NACK).

9. The method of claim 5, wherein the PHY header is encoded with a robust OFDM (ROBO) modulation scheme including a repetition code.

10. The method of claim 5, comprising decoding the MAC header and the MAC payload when the destination address field of the PHY header indicates a destination address matching the network address of the receiving node.

11. The method of claim 10, comprising performing a cyclic redundancy check (CRC) verification on the MAC header and the MAC payload prior to the decoding, wherein the decoding is performed when the CRC verification is successful and is not performed when the CRC verification fails.

12. The method of claim 11, comprising sending, from the receiving node, a negative acknowledgement (NACK) when the CRC verification fails.

13. The method of claim 12, comprising sending, from the receiving node, an acknowledgement (ACK) when the CRC verification is successful.

14. The method of claim 5, comprising:

determining whether at least one of the MAC header and the MAC payload are corrupted; and when at least one MAC header and the MAC payload is determined to be corrupted, sending a negative acknowledgement (NACK) from the receiving node if the destination address field indicates a destination address matching the network address of the receiving node.

* * * * *